United States Patent [19]

Kallenbach

[11] Patent Number: 5,461,021
[45] Date of Patent: Oct. 24, 1995

[54] METAL BORATE COMPOSITION

[75] Inventor: Lyle R. Kallenbach, Bartlesville, Okla.

[73] Assignee: Phillips Petroleum Company, Bartlesville, Okla.

[21] Appl. No.: 323,561

[22] Filed: Oct. 17, 1994

[51] Int. Cl.$^6$ ............ B01J 21/02; C03C 3/155; C01B 35/12
[52] U.S. Cl. ............ 502/202; 501/51; 501/102; 423/278; 423/279
[58] Field of Search ............ 502/202; 423/278, 423/279; 501/102, 51

[56] References Cited

U.S. PATENT DOCUMENTS

| | | | |
|---|---|---|---|
| 2,349,904 | 5/1944 | Hachmuth | 502/202 |
| 3,856,702 | 12/1974 | McArthur | 502/202 |
| 4,804,642 | 2/1989 | Ray | 501/87 |
| 5,034,206 | 7/1991 | Misra | 423/278 |
| 5,183,785 | 2/1993 | Ready | 423/278 |

OTHER PUBLICATIONS

M. C. Tsai and Y. W. Chen, "Hydrothermal Stability of Aluminum Borate", Catalysis Letters 6, (1990), pp. 225–230.

*Primary Examiner*—Asok Pal
*Assistant Examiner*—Patrick J. Neill
*Attorney, Agent, or Firm*—K. K. Brandes

[57] ABSTRACT

A novel composition comprises aluminum borate and zirconium borate. Preferably, the composition is prepared by coprecipitation. The composition is useful as a sorbent or as a catalyst material.

16 Claims, No Drawings

METAL BORATE COMPOSITION

BACKGROUND OF THE INVENTION

This invention relates to a novel metal borate composition. This composition can be used as a sorbent for separating polar compounds from hydrocarbons or as a catalyst material for hydrocarbon conversions (e.g., alkylation).

SUMMARY OF THE INVENTION

It is an object of this invention to provide a novel metal borate composition.

In accordance with this invention, a composition of matter is provided which comprises aluminum borate and zirconium borate. Preferably, this composition is prepared by a method which comprises adding an alkaline solution to an aqueous solution comprising at least one aluminum salt, at least one zirconium salt and at least one boric acid so as to raise the pit of the aqueous solution sufficiently to form a coprecipitate comprising aluminum borate and zirconium borate, separating the formed coprecipitate from the aqueous solution, drying the separated coprecipitate and calcining the dried coprecipitate at a temperature of about 450°–550° C.

DETAILED DESCRIPTION OF THE INVENTION

The metal borate composition of this invention comprising aluminum borate and zirconium borate generally has a weight ratio of Al to Zr in the range of about 2:1 to about 20:1 (preferably about 4:1 to about 12:1) and a weight ratio of (Al+Zr) to B in the range of about 1:1 to about 6:1 (preferably about 1.5:1 to about 3:1 ). Generally, this composition has a surface area (measured by the BET method employing $N_2$) of about 150 to about 350 $m^2/g$ and a pore volume (measured by a pore size distribution method employing $N_2$) of about 0.2 to about 1.5 cc/g. The particles of this composition can have any suitable shape (spherical, cyclindrical, trilobal or irregular) and can have any suitable particle size (preferably about 0.4–0.8 mm). When these particles have been compacted and extruded, the formed cyclindrical extrudates generally have a diameter of about 1–4 mm and a length of about 3–10 mm. Preferably, the composition of this invention consists essentially of borates of Al and Zr. However, it is within the scope of this invention to have minor amounts of aluminum oxide and zirconium oxide (generally about 1–5 weight-% of each) present in this composition.

Preferably, the composition of this invention is prepared by coprecipitation. First, an aqueous solution containing any water-soluble, non-hydrolyzable aluminum salt (preferably aluminum nitrate), any water-soluble, non-hydrolyzable zirconium salt (preferably zirconyl nitrate) and any water-soluble, non-hydrolyzable, acidic boron compound (preferably a boric acid, more preferably $H_3BO_3$). Any suitable concentrations of these compounds in the aqueous solution can be employed, generally about 0.02–1 mole/l of each, depending on the desired Al:Zr:B ratio. Generally, the initial pH of this aqueous solution is about 1–3. Then an aqueous alkaline solution (preferably an aqueous solution of ammonia containing about 25–28 weight-% $NH_3$), generally having a pH of about 10–14, is added to the first aqueous solution in an amount sufficient to raise the pH of the first solution to above 7, preferably to about 8–9, so as to afford the coprecipitation of borates of aluminum and zirconium. The dispersion of the formed coprecipitate in the aqueous solution is then subjected to any suitable solid-liquid separation (preferably filtration) so as to substantially separate the coprecipitate from the aqueous solution. Preferably, the coprecipitate is washed with water (to remove adhered solution therefrom), optionally followed by washing with a water-soluble organic solvent such as methanol, ethanol, isopropanol (preferred), acetone and the like. The washed coprecipitate is generally dried (preferably in a vacuum oven at a temperature of about 110°–180° C. for about 2–16 hours) and is then calcined (generally in air, at a temperature of about 450°–550° C. for about 3–16 hours). It is within the scope of this invention to mix the formed coprecipitate with an effective binder material (such as a polyglycol, a polyoxazoline or carbon black) which is substantially burned off during the calcining step. It is also within the scope of this invention to extrude or pelletize the coprecipitate (with or without a binder) before the calcination.

The composition of matter of this invention can be used in a variety of applications. For instance, this composition can be used as a sorbent for separating polar substances (such as water, alcohols, ethers, aldehydes, ketones, amines, mercaptans, organic sulfides, carboxylic acids, carboxylic acid anhydrides, carboxylic acid amides, esters and nitriles) from hydrocarbons containg 1–10 carbon atoms per molecule (in particular, liquid $C_4$–$C_8$ alkanes and/or alkenes, as is illustrated in Examples II and III). Or this composition can be used as a catalyst, optionally in conjunction with a sulfonic acid (such as trifluromethanesulfonic acid), for alkylating lower alkanes with alkenes (in particular, isobutane with butene-2) so as to form higher alkanes which are useful as motor fuels, as is illustrated in Example IV.

The following examples are presented to further illustrate the present invention and are not to be construed as unduly limiting the scope of this invention.

EXAMPLE I

This example illustrates the preparation of an aluminum zirconium borate composition in accordance with the preferred preparation method of this invention.

Composition A was prepared as follows:13.75 grams (0.05 mole) of $ZrO(NO_3)_2 \cdot 2H_2O$ (formula weight:267) and 220.9 grams (0.59 mole) of $Al(NO_3)_3 \cdot 9H_2O$ (formula weight:375) were mixed with 48.1 grams (0.78 mole) of $H_3BO_3$ (orthoboric acid; formula weight:62) and 1.5 liters of distilled water. The mixture was heated until all solids were dissolved. Then 31.4 grams of a binder additive, which contained 8.0 weight-% of poly(2-ethyl-2-oxazoline) (PEOZ; available as "Dow Binder" from Dow Chemical Company, Midland, Mich.), 2.8 weight-% poly(ethylene glycol) (PEG; molecular weight:300; available from Aldrich Chemical Company, Milwaukee, Wis.) and isopropanol as the remainder, was added to the mixture with stirring. Thereafter, concentrated aqueous ammonia was added to the entire mixture (pH:about 2) until the pH rose to about 8 and an Al—Zr-borate coprecipitate was formed. A second batch of Al—Zr-borate was prepared essentially in accordance with the above procedure. Both batches were combined and filtered. The combined filter cake was washed with about 1.5 liter of distilled water and then with 1.5 liter of isopropanol. The solid filter cake was dried at 150° C. overnight in a vacuum oven, followed by calcining in air at 500° C. (so as to burn off the added polymeric binders). The calcined material had a surface area (measured by the BET method using $N_2$) of 295 $m^2/g$ and a pore volume (measured by a $N_2$ pore size distribution method) of 0.36 $cm^3/g$. It contained 30.0 weight-% Al, 8.4 weight-% Zr and 11.0 weight-% B.

Composition B was essentially prepared in accordance with the procedure for Composition A, except that no binder additive had been added. The surface area of this material was 187 m²/g, and the pore volume was 1.22 cm³/g.

Both compositions were ground and sieved. A 20–40 mesh fraction of Composition B was retained for further testing.

EXAMPLE II

This example illustrates the use of a coprecipitated Al—Zr-borate composition (described in Example I) for absorbing various polar organic substances from dilute solutions of these substances in a liquid alkane.

Four dilute solutions were prepared and tested:(a) 1 mL methanol+99 mL n-pentane; (b) 1 mL ethanol+99 mL n-pentane; (c) 1 mL acetone+99 mL n-pentane; and (d) 1 mL acetaldehyde+99 mL n-pentane. The following solid sorbents were used in the absorption tests:a 20–40 mesh fraction of Composition B (Al—Zr-borate) and a 20–40 mesh fraction of alumina (surface area:210. m²/g; pore volume:0.4 cm³/g). Both materials had been calcined at 479° C. in air for about 16 hours and were then allowed to cool.

About 4 mL of each of the four solutions was mixed with 2 grams of each of the two sorbents. Each mixture was placed in a sealed ampoule which was shaken overnight at about 30° C. Thereafter, each solution was analyzed by means of a gas chromatograph to determine the amount of the particular polar solute (methanol, ethanol, acetone or acetaldehyde) which remained in the n-pentane solution after it had been contacted with Al—Zr-borate (Composition B) and alumina, respectively. Test results are summarized in Table I.

TABLE I

| Sorbent | Sorbate | % Removal n-Pentane Solution |
|---|---|---|
| Al-Zr-Borate (Invention) | Methanol | 91.0 |
| " | Ethanol | 93.6 |
| " | Acetone | 82.9 |
| " | Acetaldehyde | 96.7 |
| Alumina (Control) | Methanol | 74.3 |
| " | Ethanol | 58.4 |
| " | Acetone | 76.3 |
| " | Acetaldehyde | 95.3 |

Test data in Table I clearly show that the composition containing coprecipitated aluminum borate and zirconium borate adsorbed more of each polar organic substance than conventional alumina. An additional test showed that adsorbed methanol could be quantitatively removed from Al—Zr-borate by heating at about 240° C. for about 2 hours, thus indicating the regenerability of this sorbent composition.

A further test indicated that Al—Zr-borate reacted with water (probably to form a hydrate) and generated more heat of immersion than alumina. Based on this result, it is concluded that Al—Zr-borate absorbs more water than alumina.

EXAMPLE III

This example further illustrates the effectiveness of Al—Zr-borate as a sorbent material for polar organic substances dissolved in a liquid hydrocarbon.

A "butane/butylene" stream from a Phillips Petroleum Company refinery contained about 12.4 weight-% n-butane, about 24.9 weight-% of isobutane, about 25.6 weight-% of 1-butenes (n-butene-1, isobutylene), about 25.8 weight-% 2-butenes (cis-and trans-butene-2), about 8.0 weight-% pentanes (n- and iso-pentane), about 3.2 weight-% of pentenes, about 130 ppm acetone (i.e., 130 parts by weight of acetone per million parts by weight of feed), 3 ppm methanol and 3 ppm acetonitrile.

This refinery stream was pumped through a glass-lined stainless steel column containing a bottom layer of 8.3 grams of Alundum® (inert alumina having a surface area of less than 1 m²/g, having been calcined at 500° C. for 18 hours), a middle layer of 7.7 grams of calcined, 20–40 mesh Al—Zr-borate, and a top layer of 14.3 grams of Alundum®, at a temperature of about 30° C. After 6.5 hours, the test run was stopped and the effluent was analyzed. Result:the product contained less than 1 ppm methanol, less than 1 ppm acetonitrile, and about 36 ppm acetone. Thus, a substantial portion of these polar impurities had been removed from the refinery stream.

EXAMPLE IV

This example illustrates the use of the Al—Zr-borate composition of this invention as a catalyst material for alkane alkylation.

Composition C was prepared substantially in accordance with the procedure for Composition A except that the Dow Binder® component of the binder additive had been replaced with 8.7 weight-% of carbon black (provided by the Pigments Group of Degussa Corporation, Dublin, Ohio under the product designation of "FW18"). The coprecipitate was calcined in air at 500° C. The calcined coprecipitate contained 29.6 weight-% Al, 7.4 weight-% Zr and 9.9 weight-% B. It had a surface area of 370 m²/g and a pore volume of 0.6 cm³/g.

A 20–40 mesh sample of Composition C, which had been calcined for 3 hours in air at 350° C., was employed as a catalyst for the alkylation of isobutane with butene-2. A feed mixture containing 90 weight-% of isobutane and 10 weight-% butene-2 was passed through a stainless steel tube (inner diameter:0.22 inch, length:60 inches) which contained 17.0 grams of calcined Composition C. The reaction temperature was about 32° F., the reaction pressure was about 100 psig, and the feed rate of the liquid hydrocarbon feed was about 0.25 cc/minute. The alkylation product was analyzed by means of a gas chromatograph. Result:the olefin conversion was 98–99%, the alkylate contained about 57 weight-% of $C_8$ hydrocarbons and about 38 weight-% of $C_9$+hydrocarbons; the octane number, (Research Octane Number+Motor Octane Number) ÷2, was in the range of 80–85. This result indicates that Al—Zr borate is an effective alkylation catalyst.

In another alkylation test, about 1.0 cc of trifluormethane sulfonic acid (triflic acid) had been added together with 17.0 grams of Composition C to the reactor tube (described above). Result:the olefin conversion was about to 100%, and the octane number (defined above) of the alkylate was to about 89. The alkylate contained about 73 weight-% $C_8$ hydrocarbons, about 12 of weight-% of $C_9$+hydrocarbons and about 14 weight-% of $C_7$-hydrocarbons. This result demonstrates that a combination of triflic acid and Al—Zr borate was an even more effective alkylation catalyst than Al—Zr borate alone.

Reasonable variations, modifications and adaptations for various usages and conditions can be made within the scope of the disclosure and the appended claims, without departing from the scope of this invention.

That which is claimed:

1. A composition of matter comprising aluminum borate and zirconium borate.

2. A composition in accordance with claim 1, wherein the weight ratio of Al to Zr is in the range of about 2:1 to about 20:1.

3. A composition in accordance with claim 2, wherein the weight ratio of (Al+Zr) to B is in the range of about 1:1 to about 6:1.

4. A composition in accordance with claim 2, wherein the weight ratio of Al to Zr is in the range of about 4:1 to about 12:1.

5. A composition in accordance with claim 4, wherein the weight ratio of (Al+Zr) to B is in the range of about 1.5:1 to about 3:1.

6. A composition in accordance with claim 2 having a surface area of about 150–350 $m^2/g$ and a pore volume of about 0.2–1.5 cc/g.

7. A composition in accordance with claim 6 having a particle size of about 0.4–0.8 mm.

8. A composition in accordance with claim 6 having been compacted and extruded.

9. A composition in accordance with claim 8, wherein the formed cylindrical extrudates have a diameter of about 1–4 mm and a length of about 3–10 mm.

10. A composition in accordance with claim 1 having been prepared by a method which comprises adding an alkaline solution to an aqueous solution comprising at least one aluminum salt, at least one zirconium salt and at least one boric acid so as to raise the pH of said aqueous solution sufficiently to form a coprecipitate comprising aluminum borate and zirconium borate, separating the formed coprecipitate from said aqueous solution, drying the separated coprecipitate and calcining the dried coprecipitate at a temperature of about 450°–550° C.

11. A composition in accordance with claim 10, wherein the weight ratio of Al to Zr is in the range of about 2:1 to about 20:1 and the weight ratio of (Al+Zr) to B is in the range of about 1:1 to about 6:1.

12. A composition in accordance with claim 10, wherein the weight ratio of Al to Zr is in the range of about 4:1 to about 12:1 and the weight ratio of (Al+Zr) to B is in the range of about 1.5:1 to about 3:1.

13. A composition in accordance with claim 10 wherein said aluminum salt is aluminum nitrate, said at least one zirconium salt is zirconyl nitrate, and said at least one boric acid is orthoboric acid.

14. A composition in accordance with claim 13, wherein the initial pH of said aqueous solution employed in the preparation of said composition is about 1–3.

15. A composition in accordance with claim 10, wherein said alkaline solution employed in the preparation of said composition is an aqueous solution of ammonia.

16. A composition in accordance with claim 15 wherein the pH of said aqueous solution has been raised to about 8–9 after said alkaline solution has been added.

* * * * *